(12) United States Patent
Chinnam et al.

(10) Patent No.: US 9,928,120 B1
(45) Date of Patent: Mar. 27, 2018

(54) CONFIGURING LOGICAL UNIT NUMBER MAPPING FOR MULTIPLE SCSI TARGET ENDPOINTS

(71) Applicant: EMC IP Holding Company LLC, Hopkinton, MA (US)

(72) Inventors: Shobhan Kumar Chinnam, Cupertino, CA (US); Hendrik Tanto, San Jose, CA (US); Robert Fair, Cary, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 286 days.

(21) Appl. No.: 14/707,587

(22) Filed: May 8, 2015

Related U.S. Application Data (63) Continuation-in-part of application No. 14/673,715, filed on Mar. 30, 2015.

(51) Int. Cl.
*G06F 13/00* (2006.01)
*G06F 9/52* (2006.01)
*G06F 13/42* (2006.01)
*G06F 13/38* (2006.01)
*G06F 13/364* (2006.01)

(52) U.S. Cl.
CPC ............ *G06F 9/526* (2013.01); *G06F 13/364* (2013.01); *G06F 13/385* (2013.01); *G06F 13/4221* (2013.01)

(58) Field of Classification Search
USPC ..... 710/104–110, 305–317, 36–38; 711/114, 711/154, 162
See application file for complete search history.

(56) References Cited

U.S. PATENT DOCUMENTS

| | | | |
|---|---|---|---|
| 6,888,792 B2 | 5/2005 | Gronke | |
| 7,711,789 B1 | 5/2010 | Jnagal | |
| 7,782,869 B1 | 8/2010 | Chitlur Srinivasa | |
| 8,077,730 B2 | 12/2011 | Maveli | |
| 8,107,467 B1 * | 1/2012 | Madnani | H04L 29/12047 370/383 |
| 8,213,447 B2 | 7/2012 | Hurley | |
| 8,274,881 B2 | 9/2012 | Allen | |
| 8,626,967 B1 | 1/2014 | Naik | |
| 8,627,136 B2 * | 1/2014 | Shankar | G06F 11/2028 709/212 |
| 8,756,370 B1 * | 6/2014 | Liu | G06F 3/0617 711/114 |
| 8,812,806 B2 * | 8/2014 | Fredricksen | G06F 17/30079 707/602 |

(Continued)

*Primary Examiner* — Raymond Phan
(74) *Attorney, Agent, or Firm* — Staniford Tomita LLP (57) ABSTRACT

Embodiments are described for systems and methods of reconfiguring logical units (LUN) in a network of SCSI target endpoints by defining a first bitmap associated with each LUN of a plurality of LUNs in the network, wherein each bit of the first bitmap represents an endpoint utilizing a corresponding LUN so that a bit pattern of the first bitmap represents a first set of endpoints utilizing the corresponding LUN, applying a lock to block I/O operations to the plurality of LUNs, updating the first bitmap to generate a second bitmap representing a second set of endpoints utilizing the corresponding LUN, and releasing the lock to update a LUN to endpoint mapping for the plurality of LUNS and the endpoints in a single update operation.

16 Claims, 10 Drawing Sheets

(56) References Cited

U.S. PATENT DOCUMENTS

| | | | |
|---|---|---|---|
| 8,819,383 B1* | 8/2014 | Jobanputra | G06F 3/0613 |
| | | | 711/154 |
| 8,839,043 B1 | 9/2014 | Long | |
| 8,949,656 B1 | 2/2015 | Ninan | |
| 9,298,566 B2 | 3/2016 | Lefevre | |
| 9,390,034 B1 | 7/2016 | Fair | |
| 2002/0129246 A1 | 9/2002 | Blumenau | |
| 2003/0126242 A1 | 7/2003 | Chang | |
| 2004/0199353 A1 | 10/2004 | Bringham | |
| 2005/0102603 A1 | 5/2005 | Tapper | |
| 2007/0174851 A1 | 7/2007 | Smart | |
| 2007/0239944 A1 | 10/2007 | Rupanagunta | |
| 2008/0005311 A1 | 1/2008 | Ali | |
| 2008/0127326 A1 | 5/2008 | Dugan | |
| 2008/0162813 A1 | 7/2008 | Haustein | |
| 2009/0254640 A1 | 10/2009 | Otani | |
| 2009/0307330 A1 | 12/2009 | Allen | |
| 2009/0307378 A1 | 12/2009 | Allen | |
| 2010/0149980 A1 | 6/2010 | Cheung | |
| 2010/0250785 A1 | 9/2010 | Shin | |
| 2010/0293552 A1 | 11/2010 | Allen | |
| 2011/0239014 A1 | 9/2011 | Karnowski | |
| 2011/0239213 A1 | 9/2011 | Aswani | |
| 2011/0302287 A1 | 12/2011 | Muppirala | |
| 2012/0079499 A1 | 3/2012 | Gold | |
| 2012/0084071 A1 | 4/2012 | Cyr | |
| 2012/0254554 A1 | 10/2012 | Nakajima | |
| 2013/0198739 A1 | 8/2013 | Razdan | |
| 2013/0246666 A1 | 9/2013 | Vemuri | |
| 2014/0281306 A1* | 9/2014 | Nakajima | G06F 3/0647 |
| | | | 711/162 |
| 2014/0281715 A1 | 9/2014 | Khan | |
| 2014/0317265 A1 | 10/2014 | James | |
| 2014/0317437 A1 | 10/2014 | LeFevre | |
| 2015/0106518 A1 | 4/2015 | Amann | |
| 2015/0134901 A1* | 5/2015 | Goodman | G06F 3/0689 |
| | | | 711/114 |
| 2015/0134902 A1* | 5/2015 | Goodman | G06F 3/0689 |
| | | | 711/114 |
| 2015/0269039 A1 | 9/2015 | Akirav | |
| 2016/0034366 A1 | 2/2016 | Anglin | |

\* cited by examiner

ACCESS GROUP
205

| DEVICES | LUN | BITMAP |
|---|---|---|
| 1 : 2 : 0 : 0 | 0 | 0xFE |
| 1 : 2 : 1 : 0 | 1 | 0xFE |

INITIATORS

CONFIGURING LOGICAL UNIT NUMBER MAPPING FOR MULTIPLE SCSI TARGET ENDPOINTS

CROSS-REFERENCE TO RELATED APPLICATIONS

The present application is a Continuation-in-Part of and claims priority to U.S. patent application Ser. No. 14/673,715 filed on Mar. 30, 2015, entitled "Transparent Virtualization of SCSI Transport Endpoints Between Base and Virtual Fibre Channel Ports," and assigned to the assignee of the present application.

TECHNICAL FIELD

Embodiments are generally directed to data storage systems, and more specifically to configuring LUN mapping in networks with large numbers of SCSI target endpoints.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Modern computer data storage systems, such as storage area networks (SAN) in enterprise environments often use the Fibre Channel (FC) network technology to provide high-speed (e.g., 2 to 16 gigabit/second) data transfers. A Fibre Channel network comprises a number of ports that are connected together, where a port is any entity that actively communicates over the network (either optical fiber or copper), where a port is usually implemented in a device such as disk storage or a Fibre Channel switch. The Fibre Channel protocol transports SCSI commands over Fibre Channel networks, and network topologies include point-to-point, arbitrated loop (devices in a ring), and switched fabric (devices/loops connected through switches). The Fibre Channel protocol comprises five layers in which a protocol mapping layer (FC4) encapsulates application protocols (i.e., SCSI or IP) into protocol data units (PDUs) for delivery to the physical layers (FC2 to FC0).

The SCSI (Small Computer System Interface) standards used by Fibre Channel networks define certain commands, protocols and electrical/optical interface characteristics for connected devices, such as hard disks, tape drives, and controllers. In data storage networks, a SCSI initiator is typically a computer that initiates a SCSI session by sending a SCSI command, and SCSI target is a data storage device that responds to initiators' commands and provides the required input/output data transfers.

In typical storage network systems, a logical unit number (LUN) is used to identify a logical unit, which is a device addressed by the SCSI protocol or SAN protocols that encapsulate SCSI, such as Fibre Channel or iSCSI networks. A LUN may be used with any device that supports read/write I/O (input/output) operations, and often refers to a logical disk as created on a SAN. In present systems, the configuration of LUN mapping on large numbers of SCSI target endpoints is serialized. That is, reassigning LUNs to different endpoints is done serially, one endpoint at a time. This is disruptive to ongoing I/O operations and takes longer to complete, especially for systems with many endpoints/LUNs. For example, in a current implementation of data domain operating system (DDOS), the system supports relatively few SCSI target endpoints (e.g., up to 8) and fewer LUNs (e.g., up to 640). As storage network operating systems (e.g., DDOS) scale up to support large numbers of SCSI target endpoints and large numbers of LUNS, the configuration of the endpoints with the LUN mapping compounds with the overhead of the current configuration approach.

A current approach configures the LUNs on the endpoints based on unique identifiers (IDs) assigned to each endpoint that is limited to 2 bytes. This limits the number of SCSI target endpoints that can be supported to 16. As stated above, another limitation comes with the serialized approach to configuring a LUN on multiple SCSI target endpoints, so that each time a LUN mapping is configured on an endpoint a suspend I/O activity operation must be performed to stop accepting new I/O commands and drain the outstanding I/O command to completion before the configuration can be completed. This can be disruptive with features that allow endpoints to migrate during failover and failback and other high availability (HA) network features.

What is needed is a LUN mapping scheme for large numbers of SCSI target endpoints that simultaneously configures the LUN mapping on multiple SCSI target endpoints with minimal disruption to customer backups and that also reduces the time required for endpoint migration and failover/failback operations.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain (DD), Data Domain Restorer, and Data Domain Boost are trademarks of EMC Corporation of Hopkinton, Mass.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

A detailed description of one or more embodiments is provided below along with accompanying figures that illustrate the principles of the described embodiments. While aspects of the invention are described in conjunction with such embodiments, it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the described embodiments.

Disclosed herein are methods and systems of providing the ability for fast and simultaneous configuration of multiple SCSI target LUNs on a large number of SCSI target endpoints with minimal disruption to ongoing I/O operations. The disruptions due to serialized LUN mapping configuration is drastically reduced to provide enhanced customer experience during endpoint migration and failover/failback operations. Embodiments may be implemented in a data storage system that performs backup, archiving, and disaster recovery operations with deduplication functionality. Such a system is illustrated by the data domain restorer (DDR) system provided by EMC Corporation, though other similar systems are also possible.

Embodiments are directed to a LUN mapping scheme for multiple SCSI target endpoints. In order to support large number of SCSI target endpoints, the data storage system (e.g., SAN or similar network) uses a bitmap associated with each LUN where each endpoint corresponds to a bit in the bitmap array. The problem of serialized configuration is addressed by batching the operations on each LUN in a single operation using a LUN mapping scheme that updates all individual LUN to endpoint bitmaps in a single operation. This avoids multiple disruptions of the I/O and minimizes the disruption by completing the entire configuration in a single suspend I/O activity operation. When this method is cumulatively used for configuring a large number of LUNs (e.g., up to 4k) for a large number of targets (e.g., up to 128) the number of operations required compared to previous approaches is drastically reduced to only a single operation. This helps reduce the time required to perform operations such as failover/failback and migration of endpoints in a single node, and other high availability operations. This new scheme also helps minimize I/O disruptions for network users and service customers.

Figure 1A:
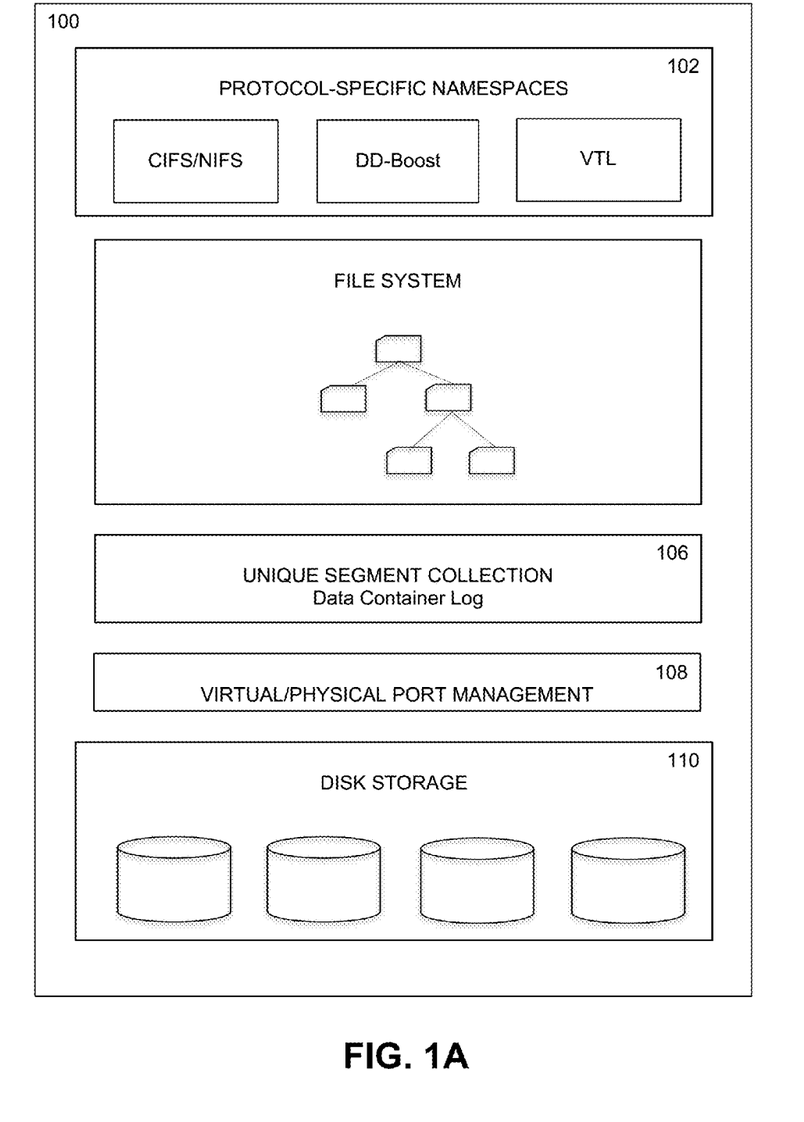
FIG. 1A illustrates logical and physical system layers for a data storage system that implements a system for managing NPIV and non-NPIV Fibre Channel ports, under some embodiments.

In an embodiment, the LUN-endpoint mapping scheme is utilized in a Fibre Channel data storage system with many multiple SCSI target endpoints defining both physical and virtual ports. FIG. 1A illustrates logical and physical system layers for a data storage system that implements a system for mapping LUNs on SCSI target endpoints, such as virtualized Fibre Channel ports, under some embodiments. FIG. 1A illustrates functional layers for an example large-scale deduplication storage system, such as a DDR system. System 100 illustrates the functional layers within a data domain or DDR operating system (DD OS) in which protocol-specific namespaces are presented to clients/applications for accessing a logical file system layer. The files and directories all reference the same pool of unique segments (collections), which is made up of log-structured containers that organize the segments on disk to optimize data throughput and deduplication effectiveness. As shown in FIG. 1A, the protocol-specific namespaces 102 are the external interface to applications and include NFS (network file system) and CIFS (common internet file system) namespaces, as well as DD Boost provided by EMC Corporation, and in some cases a virtual tape library (VTL). In general, DD Boost (Data Domain Boost) is a system that distributes parts of the deduplication process to the backup server or application clients, enabling client-side deduplication for faster, more efficient backup and recovery. A data storage deployment may use any combination of these interfaces simultaneously to store and access data. Files and directories for each namespace are stored in an MTree within the file system 104. The unique segment layer 106 is a set of files and logical MTree snapshots. The system identifies and eliminates duplicates within each container and then writes compressed deduplicated segments to physical disk. Segments are unique within the collection, and each DDR system has a single collection that is stored as a log of segment locality containers. The collection containers layer over they physical storage devices 110 that may be RAID-enabled disk drive blocks.

For DDR system 100, the Fibre Channel protocol may be employed by one or more of the namespace interfaces, such as the DD-Boost or VDisk namespaces to direct data to devices within the disk storage subsystem 110 that comprise SCSI targets. Fibre Channel allows target names to be advertised as conventional world-wide names (WWPN) or virtual names (NPIV). The Fibre Channel protocol may be enhanced through a SCSI Target subsystem to take advantage of N_Port ID virtualization (NPIV) functionality on the DDR system 100, including endpoint flexibility and failover. As shown in FIG. 1A, a virtual/physical port management layer or component 108 defines endpoints to represent SCSI targets within the Fibre Channel protocol. Endpoints are neither physical nor virtual, but are abstracted objects having attributes that can be moved around the system, and moved between physical or virtual ports dynamically (i.e., at runtime or "on the fly"). The management layer 108 (referred to either as a "virtual/physical port management layer" or "endpoint management layer") provides a unified input for endpoints representing physical, virtual, or both types of ports depending on the system configuration. Both types of ports (virtual/physical) can be mixed seamlessly for addressing by data sources so that the system administrator does not need to be concerned with whether network traffic is carried over physical or virtual fiber channels. Unlike present known Fibre Channel systems in which a physical port using WWPN is configured with NPIV on top for virtualization, the virtual/physical port management layer provides for unified management for physical ports, virtual ports, or a mix of physical and virtual ports.

Figure 1B:
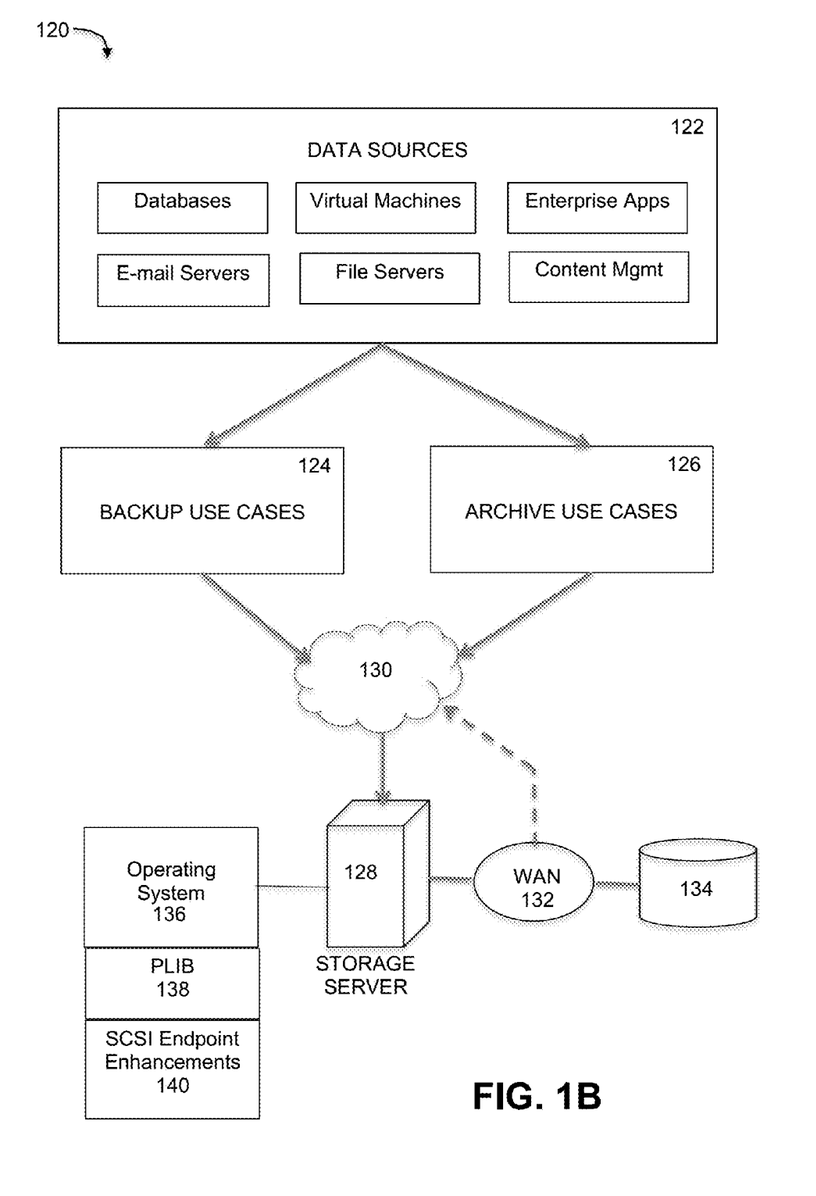
FIG. 1B is a system diagram of a deduplication data storage system implementing the layers of FIG. 1A, and that implements a SCSI endpoint enhancement method, under some embodiments.

FIG. 1B is a system diagram of a deduplication data storage system that implements embodiments of SCSI endpoint mapping method in accordance with the virtual/physical port management layer of FIG. 1A. In general, an endpoint in the SCSI Target architecture corresponds to a virtual port on the DDR. As shown in diagram 120 of FIG. 1B, data from a number of different data sources 122 is transferred to cloud or networked-based storage devices through a storage server 128. The data is stored through backup 124 and/or archive 126 use cases and the storage server 128 performs deduplication tasks to deduplicate the data during these storage operations to maximize performance and minimize disk storage requirements. In an example implementation, the deduplicated data can be replicated over a WAN (wide area network) 132 to a remote storage site 134 or a service provider site in the cloud 130 for disaster recovery operations, or other similar applications. The storage server computer 128 executes an operating system (OS) 136 that consolidates both backup and archive data on the same infrastructure. For an embodiment in which network 120 represents a DDR-based deduplication storage system, storage server 128 may be implemented as a DDR Deduplication Storage server provided by EMC Corporation. In general, the operating system 136 includes an OS kernel and associated target drivers to control the transmission of data to and from the storage devices, such as local storage 134 and/or cloud-based storage accessible through the cloud 130. In an embodiment, the OS kernel target drivers are configured to support NPIV, as defined by the Fibre Channel protocol.

Figure 2A:
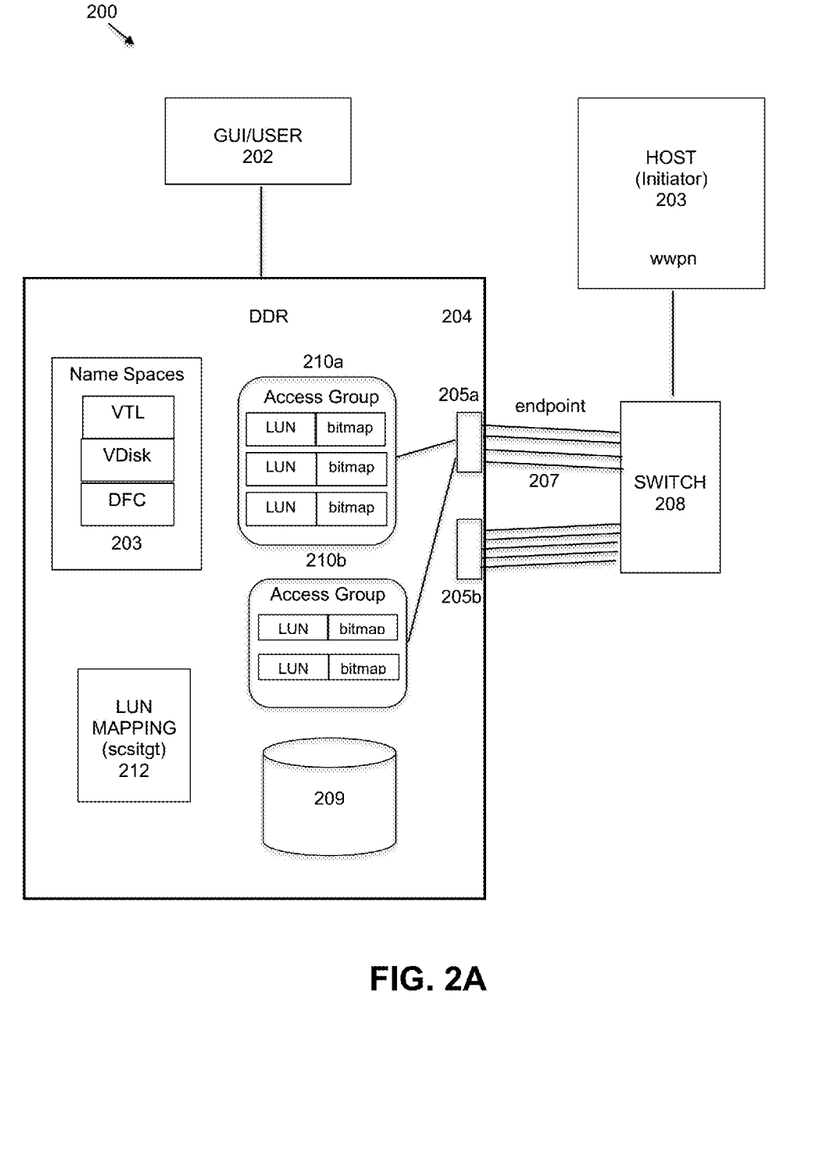
FIG. 2A illustrates a DDR system that includes a LUN mapping process and system module, under some embodiments.

FIG. 2A illustrates a DDR system that includes a LUN mapping process and system module, under some embodiments. The DDR 204 includes a number of FC ports 205a and 205b, and a storage device or devices 209 that may be disk arrays, or any other appropriate large scale device or array of devices. A host (initiator) 203 is coupled to the storage devices through one or more switches 208, which perform switching operations for fiber networks. The host 203 acts as an initiator for the SCSI storage layer and converts SCSI commands into Fibre Channel format and establish connections between the to the SAN.

The LUN mapping component 212 (scsitgt) is a management component that applies certain ITL (initiator-target-LUN) settings on the hardware and manages the SCSI target driver that controls the I/O to the DDR 204. The LUN mapping component 212 communicates with the GUI 202 and command line interface (CLI) to apply and manage the appropriate bitmaps for each LUN in the access groups 210a and 210b. Each access group encompasses LUNs, initiators and endpoints (targets) in accordance with ITL convention. In an embodiment, each access group comprises one or more LUNs with associated bitmaps that are managed by a LUN mapping component 212. The LUNs in the access groups interface with the host through endpoints 207. The physical connection from the fibre channel ports 205a, 205b may be a single cable, but may include many individual endpoints. An endpoint 207 is essentially a virtual port with its own wwn (world-wide name), and each physical port and Fibre Channel can have multiple endpoints. Through the endpoints and LUNs, the host (initiator) 203 can access the appropriate termination points for protocols (name spaces) 203. For the example of FIG. 2A, these termination points may be VTL devices, virtual disks (Vdisks), DFC (DD-boost over FC), devices, or any other appropriate file system device.

The access groups provide multiple I/O paths to every disk device specified in the name space protocol 203, and LUN mapping module 212 maintains a bitmap array that provides the association of the LUNs and the endpoints. Each LUN is a unique identifier for a physical storage allocation in the disks or array 209. A LUN could reference an entire RAID set, a single disk or partition, or multiple disks or partitions. It should be noted that LUN may refer to a logical unit number or any logical unit addressed by the SCSI protocol (or other SAN protocol) and that is identified by a number. In an embodiment, each bitmap is a one-dimensional array in which each bit slot points to a respective endpoint, and the binary value (1 or 0) indicates whether that endpoint is used by the LUN having that bitmap. The composition and operation of the bitmaps is described in greater detail below with reference to FIG. 5.

Figure 2B:
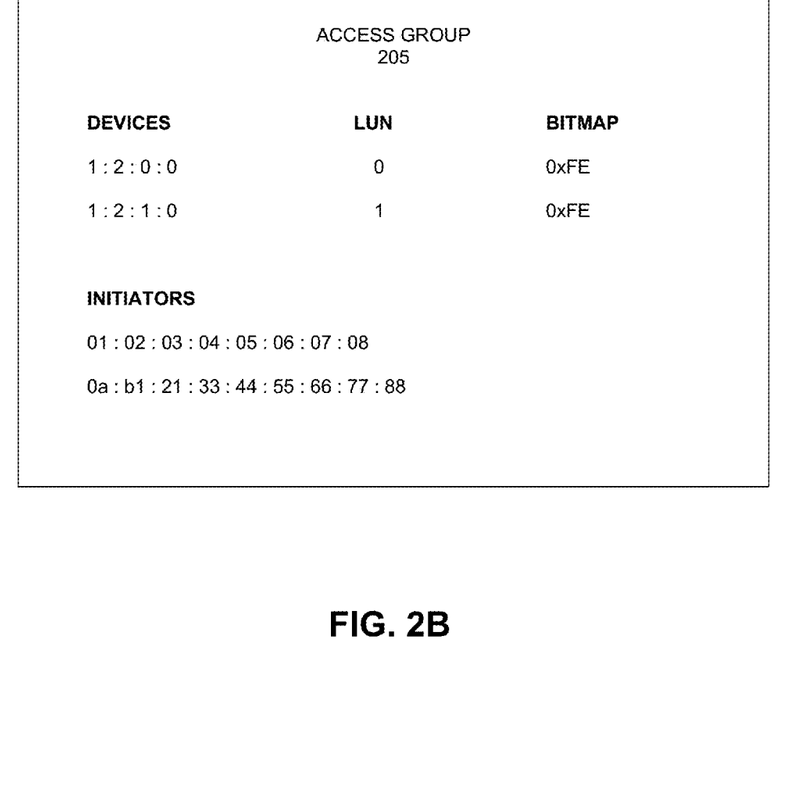
FIG. 2B illustrates an example access group, under some embodiments.

FIG. 2B illustrates an example access group, under some embodiments. An access group 205 consists of a definition of devices, LUNs used by the devices, bitmaps assigning the endpoints for the LUNS, and initiators. For the example access group of FIG. 2B, there are two devices with unique ID's (1:2:0:0 and 1:2:1:0). Device 1:2:0:0 is associated with LUN 0 and has a bitmap that specifies which endpoints are used by that LUN. Likewise device 1:2:1:0 is associated with LUN 1 and has a bitmap that specified which endpoint is used by LUN 1. The initiators access are also identified by the unique identifiers shown, and access the devices through the endpoints associated with each LUN. In the event of a configuration change (e.g., migration, failover, etc.) the bitmaps are updated by the LUN mapping component so that the initiators communicate with the proper devices, and this update is performed in one operation regardless of the number of endpoints that are reconfigured.

Figure 3:
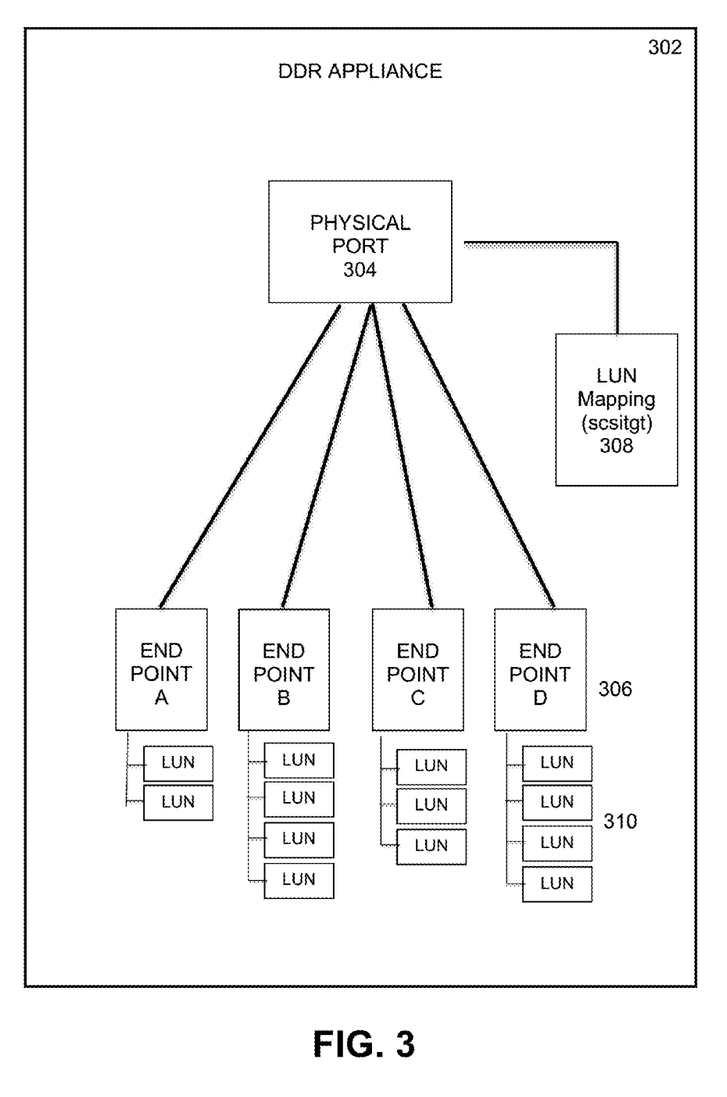
FIG. 3 illustrates an organization of physical ports and associated endpoints and LUNs within a network device, under some embodiments.

FIG. 3 illustrates an organization of physical ports and associated endpoints and LUNs within a network device, under some embodiments. In FIG. 3, a physical network device or machine, such as a DDR appliance 302 has at least one physical port 304 which may be embodied as an HBA slot or similar network node. In an embodiment, one or more mapping components allow multiple endpoints 306 to be assigned or mapped to the single physical port 304. Any practical number of endpoints, such as up to 128 endpoints may be mapped to each physical port 304 on a device 302. FIG. 3 illustrates a simple example of a system with four endpoints denoted Endpoint A, B, C, and D, but any other configuration is also possible. In a Fibre Channel system, each endpoint 306 is a named generalization of a transport-specific name in the SCSI target. It is used to expose SCSI target devices based on SCSI target access groups. The endpoint name is unique and may be modified by the user. A separate NPIV mapping component (not shown) embodies the NPIV Fibre Channel technology that allows multiple N_Port IDs to share a single physical N_Port. Each N_Port has a unique identity (WWPN) in the network, and an N_Port could be a Host Bus Adapter (HBA) in a server or a target port on a storage array. Physical port 304 may be a base port, which is a port that always exists within a physical port. As shown in FIG. 3, one physical port could have multiple virtual ports (endpoints) 306. When created, each virtual port is assigned a unique WWPN that is used by HBA firmware to perform a login. When port a failover feature is used, a virtual port serves as an endpoint. While a WWPN may be used to name a port in a Fibre Channel network, a WWNN (world wide node name) may be used to name a node in the network.

As further shown in FIG. 3, each endpoint 306 has, includes or is associated with one or more LUNs 310. For example, in a multi-disk drive system that has multiple physical SCSI ports, each endpoint is a SCSI target that is configured to one or more logical units that represent multiple volumes (in a partitioned drive). The computer that accesses a volume on the disk array identifies which volume to read or write with the LUN of the associated logical unit. A single disk-drive having one physical SCSI port provides just a single target that in turn provides a single logical unit whose LUN is zero, and this logical unit represents the entire storage of the disk drive. In the more common case of a partitioned drive, each LUN represents a different volume, with LUN ranging from LUN00 to LUNnn, for example.

In general, devices can be shared across different endpoints. For example, in a current version of DDR, one device can support up to 64 endpoints, so one device can be shared across many multiple endpoints. For the example DDR appliance 302, there may be 8 physical ports 304 with 8 endpoints per physical port, giving 64 endpoints per DDR appliance, and the number of LUNs per endpoint may be limited to 2-byte unique IDs. These numbers are provided primarily for example purposes, and other numbers may also be possible.

For the embodiment of FIG. 3, the mapping between endpoints 306 and associated LUNs 310 is accomplished through an endpoint mapping component 308 and endpoint assignment bitmaps associated with each LUN 310. This mechanism facilitates the provision of greater numbers endpoints by increasing the number of LUNs available in DDR (and other similar) systems. In many present applications, system administrators must configure many different endpoints for different tasks and portions of the DDR system, such as multi-tenant applications, human resources, finance application, and so on. This increases the need for greater numbers of endpoints, as well as the need to maintain separate namespaces (protocols) for different endpoints since each group or application typically requires their own namespace for their endpoints. Thus, depending on application, a system administrator may desire greater numbers of endpoints per physical port. For example, three endpoints per port may be desired to correspond to the three different namespace protocols 102 (e.g., VDisk, DD-Boost, VTL) illustrated in FIG. 1. Each separate namespace may constitute an access group, and an endpoint may have multiple access groups and use different I/O access paths. Devices are grouped according to protocols, such that each device is in one name space with one protocol per endpoint.

A namespace is an access group, which is essentially a collection of LUNs, and an endpoint could be in multiple access groups. Moving an access group from one endpoint to another endpoint requires adding LUNs one at a time from one endpoint to another endpoint, under current systems. In an embodiment, the LUN mapping mechanism greatly improves system performance with respect to moving LUNs among endpoints. For the example of FIG. 3, one or more of the LUNs for endpoint A may migrate or fail over to any of endpoints B, C, or D during a manual or automated migration or failover operation. Under current serialized reconfiguration schemes solutions, each LUN is moved one endpoint at a time, which requires I/O traffic to be blocked during each LUN move to allow any outstanding commands to finish execution before applying the configuration change. Thus, changing the configuration of any device is time consuming and potentially very disruptive because of the delay incurred by blocking the system.

LUN Reconfiguration Through SCSI Target Endpoint Failover/Failback

The LUN mapping scheme particularly facilitates optimized and efficient reconfiguration of devices during the movement of LUNs among different endpoints, such as during the managing of data migration, and endpoint failover/failback operations. Such reconfiguration events may be manually initiated by a user or system administrator (such as data migration), or they may be automated (such as failover/failback). Endpoints can be configured to perform failover, and optionally failback, when events associated with the underlying port occur. For example, if the port for an endpoint goes offline for an extended period the endpoint may be automatically failed over to a different, functioning, port by the system. In an embodiment, this functionality is supported for Fibre Channel ports using NPIV through a storage subsystem manager (SSM) component, and other components or functional structures and elements. The SSM monitors the target Fibre Channel port (e.g., HBA) for offline/online status, failure conditions, and/or marginal operation. When thresholds for offline/online, marginal or failure conditions are exceeded, it automatically sends alerts, and when it determines and identifies a port to be failed, it disables that port. Alerts are automatically cleared once the fault condition is cleared. A user-level interface may be provided via the OS or an alert subsystem to pass alerts and messages to the user.

Embodiments are directed to providing enhancements to the SCSI target subsystem to take advantage of NPIV functionality on data domain restorer (DDR) systems, including endpoint flexibility and failover DD OS kernel drivers have added support for NPIV. This allows new functionality to be added to the overall SCSI target solution, including additional endpoint flexibility and the ability to perform endpoint failover between physical Fibre Channel ports. Certain use cases are identified for this functionality including: (1) simplifying multiple system consolidation, (2) endpoint failure to improve single-node availability, (3) port cost reduction, (4) system management isolation for multi-tenancy, and (5) facilitating migration to DDR from environments accustomed to more target ports.

Figure 4A:
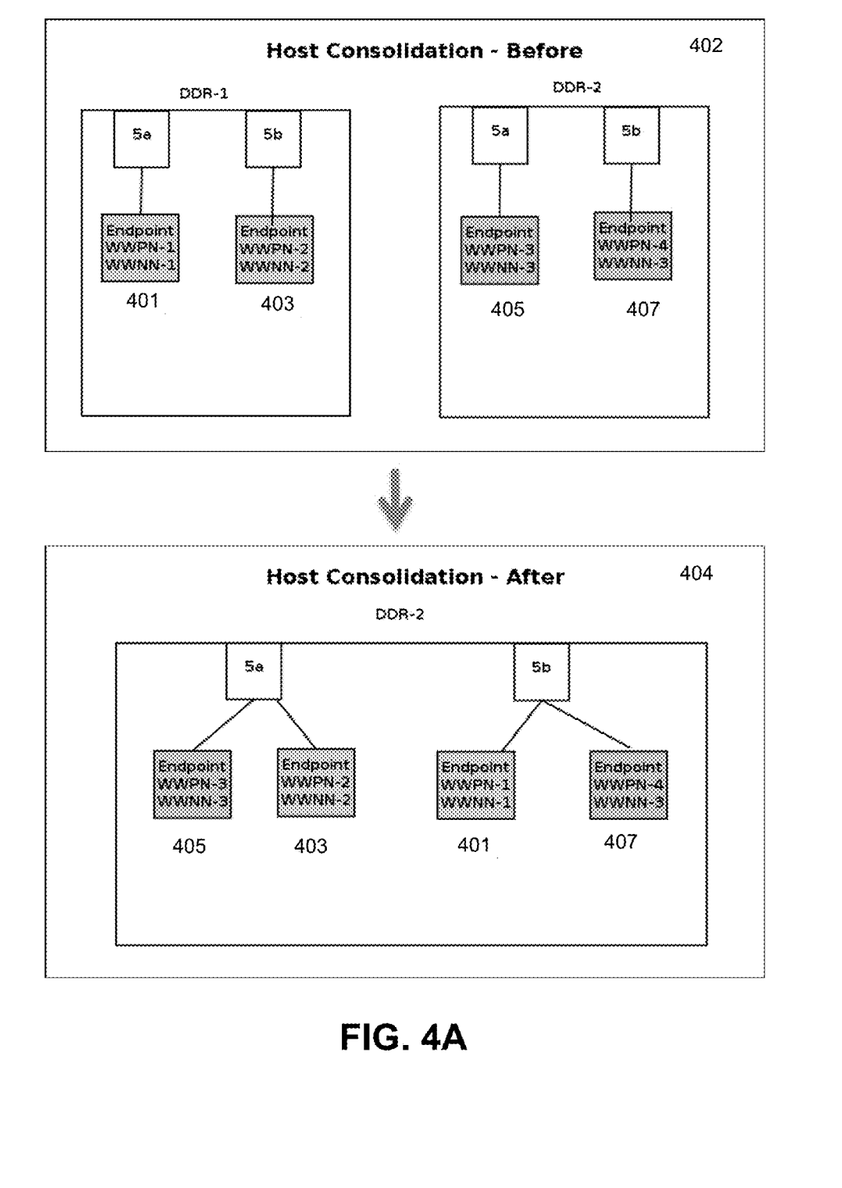
FIG. 4A illustrates an example of host consolidation using a SCSI target endpoint enhancement, under an embodiment.

With respect to system consolidation, multiple data domain restorer systems (DDRs) are consolidated into a single larger DDR, for example to reduce power usage or data-center footprint, or to improve de-duplication. To reduce the need to rezone or reconfigure existing initiators additional endpoints are configured on the consolidated system to provide equivalent access to the old discrete systems. FIG. 4A illustrates an example of host consolidation using a SCSI target endpoint enhancement, under an embodiment. Initially, there are two systems, DDR-1 and DDR-2, each with two Fibre Channel ports each with unique associated endpoints. Physical ports 5a and 5b on DDR-1 are associated with respective endpoints 401 and 403, and physical ports 5a and 5b on DDR-2 are associated with respective endpoints 405 and 407. These are then consolidated onto a single DDR (DDR-2) serving the same set of endpoints and WWPN/WWNN. Thus, as shown in FIG. 4A, DDR-2 has physical port 5a associated with endpoints 405 and 403 and port 5b associated with endpoints 401 and 407.

Figure 4B:
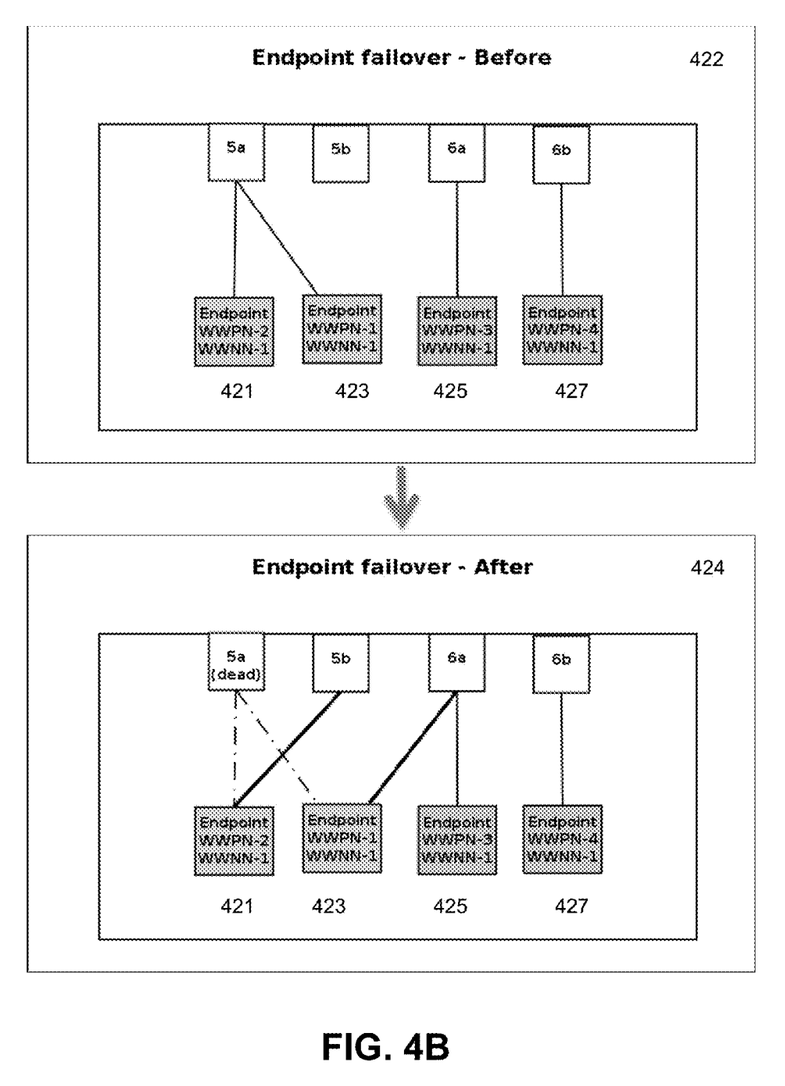
FIG. 4B illustrates an example of a typical endpoint configuration, with endpoints active on several different Fibre Channel interfaces, under an embodiment.

With respect to endpoint failover, endpoints are integrated with port failure/offline detection to failover endpoints to alternate ports in case of failure. This provides additional resilience for single-system DDRs. FIG. 4B illustrates an example of a typical endpoint configuration, with endpoints active on several different Fibre Channel interfaces. Block 422 illustrates an example state of the endpoints prior to failure in which port 5a is associated with ports 421 and 423, port 6a is associated with port 425, and port 6b is associated with port 427. If interface 5a now fails, each endpoint active on that interface may have a different failover destinations, in this case the two endpoint 421 migrates to interface 5b and endpoint 423 migrates to interface 6a and they continue to provide service, as shown in block 424.

LUN Mapping

As shown in FIGS. 4A and 4B, certain data migration or failover/failback operations involve the reconfiguration of endpoints with the DDR system. This reconfiguration is typically performed by reassigning the LUNs for the relevant endpoints from a first set of endpoints to a second set of endpoints. As shown in FIG. 3, a LUN mapping scheme for multiple SCSI target endpoints is provided to support large numbers of SCSI target endpoints and perform efficient reconfiguration of the endpoints and LUNs within the system. In an embodiment, the data storage system (e.g., SAN or similar network) uses a bitmap associated with each LUN where each endpoint corresponds to a bit in the bitmap array. The problem of serialized configuration is addressed by batching the operations on each LUN in a single operation. In an example case where a LUN migrates from endpoint A to endpoint B and C, in present systems each configuration would be independent, so it would take three successive operations to complete the reconfiguration. Using the LUN mapping process 308, the configuration change from moving the LUN from endpoint A to endpoint B and C is performed in a single operation. This avoids multiple disruptions of the I/O and minimizes the disruption by completing the entire configuration in a single suspend I/O activity operation. When this method is cumulatively used for configuring a large number of LUNs for a large number of targets, the number of operations required compared to previous approaches is drastically reduced to only a single operation. This helps reduce the time required to perform operations such as failover/failback and migration of endpoints in a single node, and other high availability operations.

In an embodiment, each LUN maintains a bitmap that the LUN mapping process 308 associates a bit map or bit array with each LUN that allows, in one operation, the LUNs to be added or moved all at once, as opposed to one at a time. Each endpoint corresponds to a bit in the array, and a defined value (e.g., "1") indicates that the corresponding endpoint uses the LUN, while the opposite value ("0") indicates that the corresponding endpoint does not use the LUN.

Figure 5:
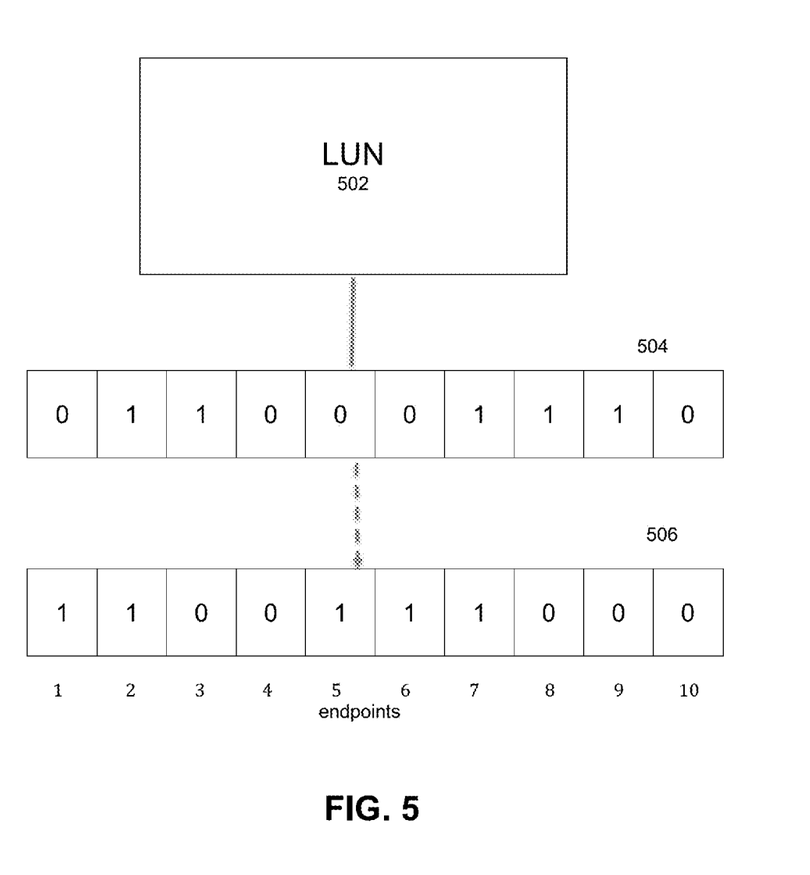
FIG. 5 illustrates a bit array defined for a LUN for configuring a LUN to endpoint mapping, under an embodiment.

FIG. 5 illustrates a bit array defined for a LUN for configuring a LUN to endpoint mapping, under an embodiment. As shown in FIG. 5, a LUN 502 has or is associated with a bitmap 504, which is a one dimensional array with a number of entries corresponding to all of the endpoints in a system or subsystem. Each LUN maintains its own bitmap for endpoints in a particular access group. For the example of FIG. 5, LUN maintains a 10 entry wide bitmap where the appropriate binary values are assigned for 10 different endpoints that may use LUN 502. An initial or current endpoint (EP) mapping for LUN 502 may be defined by the bitmap pattern 502. Thus, for example, LUN 502 may be used by EP2, EP3, EP7, EP8, and EP9 and not by EP1, EP4, EP5, EP6, and EP10 for the configuration represented by bitmap 504 at a specific time (t1). Upon reconfiguration, such as due to data migration or failover/failback operations involving any of endpoints EP1 to EP10, LUN mapping may change to that represented by bitmap 506 at time t2. Thus, for the example of FIG. 5, the reconfiguration results in LUN 502 being used by EP1, EP2, EP5, EP6, EP7, and not used by EP3, EP4, EP8, EP9, and EP10. The illustration of FIG. 5 is intended to be an example only, and the configuration and implementation of the LUN mapping bitmap may be of any appropriate size, dimension and content.

Figure 6:
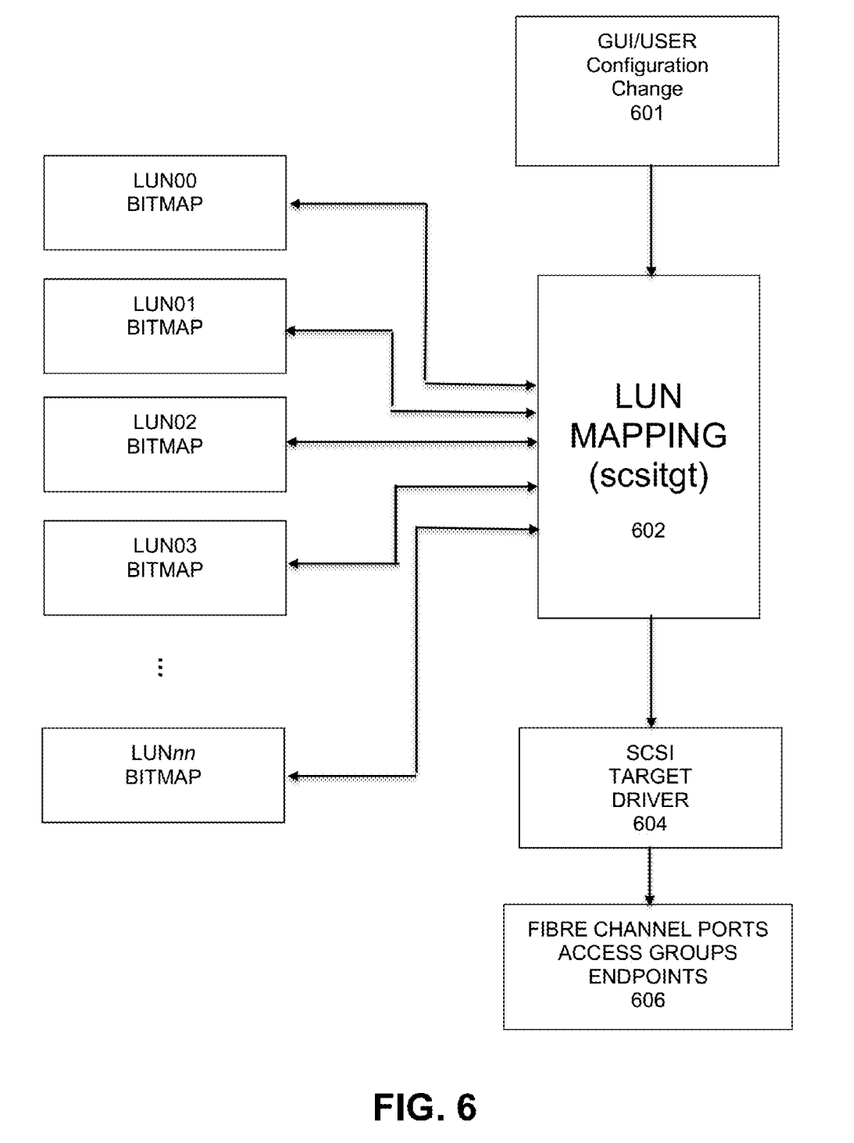
FIG. 6 illustrates operation of a LUN mapping component with individual LUN bitmaps, under an embodiment.

Each LUN in a system will maintain its own LUN-endpoint mapping bit array 504. The bitmaps for all the LUNs in a system are updated in a single operation during a reconfiguration operation from an initial state at time t1 to a new state at time t2. A LUN mapping process coordinates the updating of all of the LUN bitmaps and affects the single operation update and reconfiguration of all the LUNs and associated endpoints in the system. FIG. 6 illustrates operation of a LUN mapping component with individual LUN bitmaps, under an embodiment. As shown in FIG. 6, bitmaps for a number of LUNs (e.g., LUN00 to LUNnn) are processed by a LUN mapping component 602, which may be implemented through a scsitgt routine that manages a SCSI driver. This component receives reconfiguration information from a kernel process that is initiated by either a manual command/instruction (e.g., a data migration or backup operation), or an automated process (e.g., port failover/failback). This reconfiguration results in LUNs being mapped from first sets of endpoints to second sets of endpoints, so that each LUN has a mapping transformation, such as that shown for a specific LUN in FIG. 5. During a single operation cycle, all of the LUNS are reassigned to the new endpoints through their individual bitmaps to affect the reconfiguration command 601. The reconfiguration command or configuration change may be input by a user through a GUI or CLI, or it may be provided by an automated process. In an embodiment, LUN mapping component 602 represents a virtual component or executable process that transmits the reconfiguration or update information 601 to each LUN individually to cause the update of the current bitmap in each LUN. Thus, each LUN includes or maintains a data structure for the bitmap as well as an interface to receive the update information and effect the change of the bitmap.

As shown in FIG. 6, the LUN mapping component 602 controls a SCSI target driver 604, which controls I/O to the DDR through the components of block 606, i.e., the FC ports, access groups, and endpoints.

In an embodiment, the bitmap may be saved in each LUN individually or as part of an array in the server, as an access-group-config data structure. In a particular example implementation, the basic structure for LUN to endpoint mapping may be defined by the following example code segment:

```
#define ACG_MAX_BITMAP         256
#define ACG_NUM_LONG_BITMAP    (ACG_MAX_BITMAP/
                               BITS_PER_LONG)
#define CHARACTERS_PER_LONG    (sizeof(long) * 2)
typedef struct port_bitmap {
    unsigned long bitmap[ACG_NUM_LONG_BITMAP];
} port_bitmap_t;
/*
* Lun to device and endpoint mapping
*/
struct lun_dev {
   /* List of luns */
        struct list_head entry;
        struct device *dev; /* emulation device */
        uint64_t lun; /* lun number */
   /*read only lun ?*/
   unsigned int read:1;
   struct access_group *ag;/* grouping of luns, endpoints and
   initiators*/
   /* bitmap to store the mapping of the lun to the endpoints
   port_bitmap_t allowed_ports_bitmap;
   };
```

It should be noted that the above programming code segment is provided for purposes of illustration and that programming structures may be used depending on processor language and system configuration.

Figure 7:
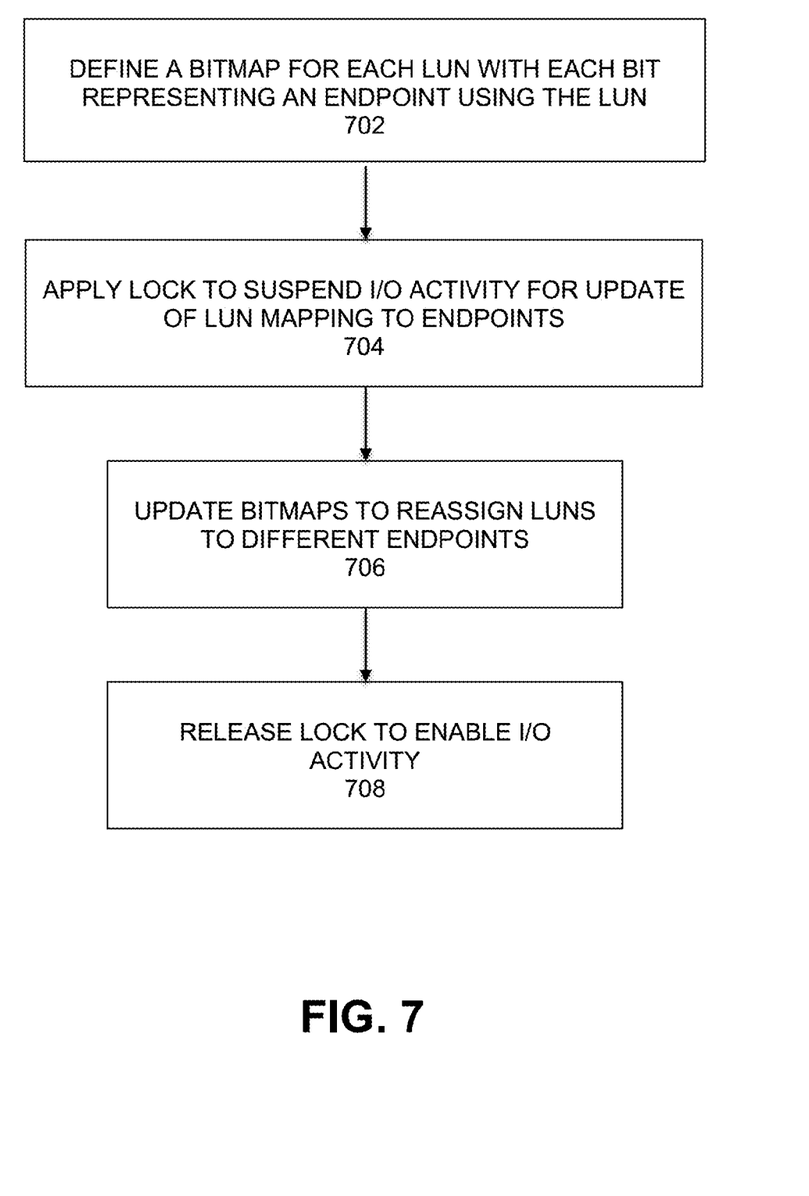
FIG. 7 is a flowchart that illustrates a method of reconfiguring LUNs in a network of SCSI target endpoints, under an embodiment.

In order to perform a system reconfiguration between an initial LUN mapping state at time t1 to a second LUN mapping state at t2, a lock is invoked to block I/O so that pending operations can be completed prior to the reconfiguration operation. Unlike present systems in which a lock is invoked for each endpoint update, only a single lock enable/release cycle is required to update all endpoints and LUNs at once. FIG. 7 is a flowchart that illustrates a method of reconfiguring LUNs in a network of SCSI target endpoints, under an embodiment. As shown in FIG. 7, the process defines a first bitmap associated with each (LUN) where each bit of the first bitmap represents an endpoint utilizing the LUN, step 702. Upon receipt of a reconfiguration command or event, the system applies a lock to block I/O operations to the LUNs, step 704. The first bitmap is then updated to generate a second bitmap representing a second set of endpoints utilizing the corresponding LUN based on the reconfiguration command, step 706. This reassigns the LUNs to different sets of endpoints. The lock is then released to enable I/O operations and update the LUN to endpoint mapping for the LUNs and the endpoints in a single update operation, step 708.

Embodiments of the LUN mapping scheme can be used to maintain many multiple endpoints and associated LUNs, and to greatly speed reconfiguration operations involving endpoint maintenance, migration, disaster recover, and other high availability features of DDR systems. In an example system with on the order of 4000 LUNs, a data migration operation (for example, moving from endpoint A to endpoints B and C) may impose 8000 disruptions using present serialized approaches. Using the LUN mapping scheme, the same data migration operation only imposes one disruption.

In addition, the LUN mapping scheme may be used in conjunction with other mapping schemes that provide SCSI target endpoint enhancements. For example, as opposed to present known Fibre Channel systems in which each physical port 304 is mapped to a single virtual port in a one-to-one relationship, other mapping components allow for the mapping of multiple endpoints (which can be virtual and/or physical) to a single physical port. This means that virtual port management (e.g., port migration, moving ports, removing ports, adding ports, etc.) can be performed on many virtual ports in a unified manner rather than simplistically through the present one-to-one port management procedures. Embodiments thus allow a SAN system to be configured with virtual endpoints that span both base and virtual ports. This is accomplished by adding certain mapping functionality to data domain (or similar) operating systems in order to virtualize transport endpoints between base and virtual ports and mapping large number of LUNs to large numbers of SCSI target endpoints. This also allows for movement of LUNs among physical ports, or even among different systems in the network in many fewer operations than presently possible and with minimization of I/O disruption due to suspend I/O activity cycles. In a highly available system, such as critical data recovery systems, the ability to migrate on the fly by moving endpoints port-to-port or system-to-system greatly facilitates the ability for data to be maintained and protected in a non-disruptive manner.

For purposes of description, certain interface names, programming elements/objects, and programming code segments will be listed and will use conventions as defined by the Fibre Channel protocol and/or in accordance with a specific operating system, such as the Data Domain Operating System (DD OS) provided by EMC Corporation. Adaptation to other operating systems can be performed using techniques known to those of ordinary skill in the art.

With respect to system management isolation and multi-tenancy, multiple endpoints managed by embodiments described herein can be used to isolate and compartmentalize access to a DDR (or other SAN) system from a management and access perspective. Consider an SMT (multi-tenant) system where it is desirable to allow tenants to manage aspects of their DDR SCSI Target access, but not interfere with other tenants. In this case the landlord could provision one or more endpoints for a tenant, then give the tenant the ability to configure the groups, devices and LUNs for that endpoint (this assumes the SCSI Target service allows corresponding separation for management). Note that multiple endpoints are a building block in the complete SMT solution for a SAN. Additional functionality would include (but not be limited to): allowing delegation of access groups to tenants, allowing delegation of device creation/deletion to tenants, and allowing delegation of SCSI Target service-specific features to tenants, for example create/delete of VTL tapes and importing/export VTL tapes from a tenant-specific tape pool to a tenant-specific VTL.

Embodiments also facilitate migration to the DDR environment from environments used to more target ports. DDR systems traditionally have a relatively low Fibre Channel port count when compared to comparable systems. By using multiple endpoints it becomes easier for new customers to migrate from environments where higher port counts are common. For example a system previously configured with 12 Fibre Channel ports may be configured with a DDR using 12 endpoints and a smaller number of physical interfaces. Embodiments support multiple SCSI Target endpoints on SCSI Target ports. That is, there may be a M:1 relationship between endpoints and ports. Endpoints can be added, deleted or migrated between ports as needed, either under administrator control or under direction of the single-node endpoint failover functionality. For the Fibre Channel transport this is supported on all topologies where NPIV is supported.

Although embodiments are described with respect to Fibre Channel systems, it should be noted that other transport protocols can also be adapted to use the virtualization methods described herein, including iSCSI and Fibre Channel over Ethernet (FCoE).

Embodiments may be applied to virtualizing SCSI transport endpoints in any scale of physical, virtual or hybrid physical/virtual network, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network. The network may comprise any number of server and client computers and storage devices, along with virtual data centers (vCenters) including multiple virtual machines. The network provides connectivity to the various systems, components, and resources, and may be implemented using protocols such as Transmission Control Protocol (TCP) and/or Internet Protocol (IP), well known in the relevant arts. In a distributed network environment, the network may represent a cloud-based network environment in which applications, servers and data are maintained and provided through a centralized cloud-computing platform. It may also represent a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

The data generated and stored within the network may be stored in any number of persistent storage locations and devices, such as local client storage, server storage, or network storage. In an embodiment the network may be implemented to provide support for various storage architectures such as storage area network (SAN), Network-attached Storage (NAS), or Direct-attached Storage (DAS) that make use of large-scale network accessible storage devices, such as large capacity tape or drive (optical or magnetic) arrays, or flash memory devices.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of reconfiguring logical units (LUN) in a network of SCSI target endpoints, comprising:
    defining a first bitmap associated with each (LUN) of a plurality of LUNs in the network, wherein each bit of the first bitmap represents an endpoint utilizing a corresponding LUN so that a bit pattern of the first bitmap represents a first set of endpoints utilizing the corresponding LUN;
    applying a lock to block I/O operations to the plurality of LUNs;
    updating the first bitmap to generate a second bitmap representing a second set of endpoints utilizing the corresponding LUN; and
    releasing the lock to update a LUN to endpoint mapping for the plurality of LUNS and the endpoints in a single update operation.

2. The method of claim 1 wherein a first binary value of a bit in the bitmap indicates that the endpoint utilizes the corresponding LUN, and a second binary value of the bit indicates that the endpoint does not utilize the corresponding LUN.

3. The method of claim 1 wherein the first bitmap is updated to the second bitmap due to reassignment of the corresponding LUN from the first set of endpoints to the second set of endpoints through a reassignment of at least one different endpoint.

4. The method of claim 1 wherein each endpoint is an abstracted object having attributes that can be moved around a network utilizing the transport ports.

5. The method of claim 3 wherein the reassignment is caused by one of an endpoint migration operation, a port failover operation, or a port failback operation.

6. The method of claim 5 wherein the reassignment is caused by one of a system automated procedure, or a manually initiated procedure performed by a system administrator, and wherein the port failover and port failback operations are system automated procedures.

7. The method of claim 5 wherein the endpoint migration operation comprises a definition of a new access group comprising at least some of the plurality of LUNs.

8. The method of claim 4 wherein the network comprises a Fibre Channel system implementing the SCSI transport ports.

9. The method of claim 1 wherein the lock comprises a driver level suspend I/O activity command executed by an operating system of the network.

10. The method of claim 8 wherein the operating system comprises a data domain restorer (DDR)-based deduplication operating system, and wherein the network comprises a storage area network.

11. A method of updating logical units in a SCSI endpoint network, comprising:
defining bit arrays for logical units (LUN) that are used by one or more endpoints;
associating each bit array with a corresponding logical unit (LUN), wherein each endpoint of one or more endpoints is represented as a bit in each bit array; and
remapping multiple LUNS used by the one or more endpoints by updating respective bits of the bit arrays to reflect a reconfiguration from a first endpoint-LUN mapping to a second endpoint-LUN mapping using a lock to block I/O operations to the multiple LUNs, wherein a bit mapping component of the system coordinates the reconfiguring from the first endpoint-LUN mapping to the second endpoint-LUN mapping, and the lock comprises a driver level suspend I/O activity command executed by an operating system of the network.

12. The method of claim 11 wherein the remapping is performed in a single operation for reconfiguring all LUNs of the network to the one or more endpoints.

13. The method of claim 12 wherein a first binary value of a bit in the bitmap indicates that the endpoint utilizes the corresponding LUN, and a second binary value of the bit indicates that the endpoint does not utilize the corresponding LUN.

14. The method of claim 12 wherein the reconfiguring is caused by one of an endpoint migration operation, a port failover operation, or a port failback operation.

15. The method of claim 14 wherein the reconfiguring is caused by one of a system automated procedure, or a manually initiated procedure performed by a system administrator, and wherein the port failover and port failback operations are system automated procedures.

16. A computer program product comprising a non-transitory computer usable medium having machine readable code embodied therein for reconfiguring logical units (LUN) in a network of SCSI target endpoints, by:
defining a first bitmap associated with each (LUN) of a plurality of LUNs in the network, wherein each bit of the first bitmap represents an endpoint utilizing a corresponding LUN so that a bit pattern of the first bitmap represents a first set of endpoints utilizing the corresponding LUN;
applying a lock to block I/O operations to the plurality of LUNs;
updating the first bitmap to generate a second bitmap representing a second set of endpoints utilizing the corresponding LUN; and
releasing the lock to update a LUN to endpoint mapping for the plurality of LUNS and the endpoints in a single update operation.

* * * * *